United States Patent
Miyamoto et al.

(10) Patent No.: US 7,163,093 B2
(45) Date of Patent: Jan. 16, 2007

(54) SYNCHRONIZER FOR TRANSMISSION

(75) Inventors: Akihiro Miyamoto, Atsugi (JP); Masashi Yoshino, Yamato (JP)

(73) Assignee: Nissan Motor Co., Ltd., Yokohama (JP)

( * ) Notice: Subject to any disclaimer, the term of this patent is extended or adjusted under 35 U.S.C. 154(b) by 152 days.

(21) Appl. No.: 11/062,578

(22) Filed: Feb. 23, 2005

(65) Prior Publication Data

US 2005/0199466 A1 Sep. 15, 2005

(30) Foreign Application Priority Data

Mar. 9, 2004 (JP) .............................. 2004-066081
Sep. 24, 2004 (JP) .............................. 2004-278221

(51) Int. Cl.
*F16D 23/06* (2006.01)

(52) U.S. Cl. .................................... 192/53.34; 192/108

(58) Field of Classification Search ...................... None
See application file for complete search history.

(56) References Cited

U.S. PATENT DOCUMENTS 4,584,892 A * 4/1986 Hiraiwa et al. ............... 74/339
5,038,884 A * 8/1991 Hamada et al. ............. 180/233
5,052,986 A * 10/1991 Jarchow et al. ............... 475/76

FOREIGN PATENT DOCUMENTS

JP 6-058344 A 3/1994

* cited by examiner

*Primary Examiner*—Saul Rodriguez
(74) *Attorney, Agent, or Firm*—Foley & Lardner LLP

(57) ABSTRACT

A synchronizer for a transmission including: a synchronizer hub; a synchronizer sleeve slidable thereon to engage with a clutch gear, which is provided with sleeve spline teeth having sleeve chamfers; and a synchro ring having a plurality of pairs of synchro ring spline teeth each having a synchro ring chamfer for receiving one of the sleeve chamfers. The synchro ring chamfer has a leading edge offset from the center of each synchro ring spline tooth, so that a distance between the leading edges becomes greater than a distance between the centers of the synchro ring spline teeth in each of the pairs of the synchro ring spline teeth. Moreover, the sleeve spline teeth are provided on the synchronizer sleeve only in angular positions between the synchro ring spline teeth of each of the pairs.

12 Claims, 12 Drawing Sheets

ATVs>Vc

ATVs>Vc

ATVs>Vc

FIG.15B DOWN

FIG.16B UP

SYNCHRONIZER FOR TRANSMISSION

BACKGROUND OF THE INVENTION

1. Field of Invention

The present invention relates to a synchronizer for a transmission, which includes a synchronizer sleeve (or a coupling sleeve) and a synchro ring (a balk ring, or a synchronizer ring), and more particularly, to a synchronizer for a transmission, which realizes a smooth shifting operation through synchronous rotation upon movement of the synchronizer sleeve to the synchronizing side by a manual operation or an actuator for the shifting operation.

2. Description of Related Art

JP-A-6-58344 discloses a synchronizer for a manual gear transmission. The synchronizer has alternately arranged short spline teeth for synchronization and long spline teeth for engagement. When a synchronizer sleeve and a synchro ring thereof are in the neutral state, each of the spline teeth for synchronization is placed in a trough portion (or a valley portion) defined by single chamfers (or one-side chamfers) of a pair of the synchro ring spline teeth adjacent to each other, and each of the spline teeth for engagement is placed on a peak portion defined by the single chamfers.

SUMMARY OF THE INVENTION

In the aforementioned synchronizer, the spline teeth for synchronization and the spline teeth for engagement are placed in angular positions at the trough portions and the peak portions defined by the synchro ring spline teeth, respectively. Accordingly the index stroke δ of the synchro ring is limited to half of the spline teeth pitch. In order to obtain the larger index stroke δ, the pitch has to be increased by reducing the number of the synchro ring spline teeth.

The "index stroke δ of the synchro ring" represents a stroke of angular displacement of the synchro ring relative to the synchronizer hub (or the synchronizer sleeve) from a neutral position thereof to a position where a convex portion formed in the synchro ring comes into contact with a concave portion in key-engagement with the concave porion, formed in the synchronizer hub. The "pitch" represents a distance between a point of a synchro ring spline tooth on an equiangularly arranged synchro ring spline teeth and a corresponding point on the next tooth, or a distance between the centers of the adjacent teeth (if each of the spline teeth has the same width, the pitch may be obtained by adding the width of the space between the adjacent spline teeth to the width of each of the spline teeth). Here, the distance between the centers of the adjacent synchro ring spline teeth is called one pitch 1P.

It is an object of the present invention to provide a synchronizer for a transmission, which is capable of increasing an index stroke δ of the synchro ring without changing the pitch of the synchro ring spline teeth while improving durability against the gear squeak.

An aspect of the present invention is a synchronizer for a transmission comprising: a synchronizer hub connected to a main shaft of the transmission; a clutch gear connected to an idle gear of the transmission; a synchronizer sleeve connected to the synchronizer hub and slidable thereon to engage with the clutch gear, the synchronizer sleeve provided with sleeve spline teeth each having a sleeve chamfer; and a synchro ring having a plurality of pairs of synchro ring spline teeth, each of the synchro ring spline teeth having a synchro ring chamfer configured for receiving one of the sleeve chamfers, wherein each of the synchro ring chamfers is formed to have a leading edge offset from the center of each of the synchro ring spline teeth, so that a distance between the leading edges becomes greater than a distance between the centers of the synchro ring spline teeth in each of the pairs of the synchro ring spline teeth, and wherein each of the sleeve spline teeth is provided only in an angular position between the synchro ring spline teeth of each of the pairs on the synchronizer sleeve.

BRIEF DESCRIPTION OF THE DRAWINGS

The invention will now be described with reference to the accompanying drawings wherein:

FIG. 15B is a view showing an operation of the synchronizer sleeve spline tooth and the first synchro ring spline teeth in the synchronizer of the sixth embodiment at downshifting;

FIG. 16B is a view showing an operation of the synchronizer sleeve spline tooth and the first synchro ring spline tooth in the synchronizer as another example of the sixth embodiment at upshifting;

DETAILED DESCRIPTION OF THE PREFERRED EMBODIMENT

Figure 1:
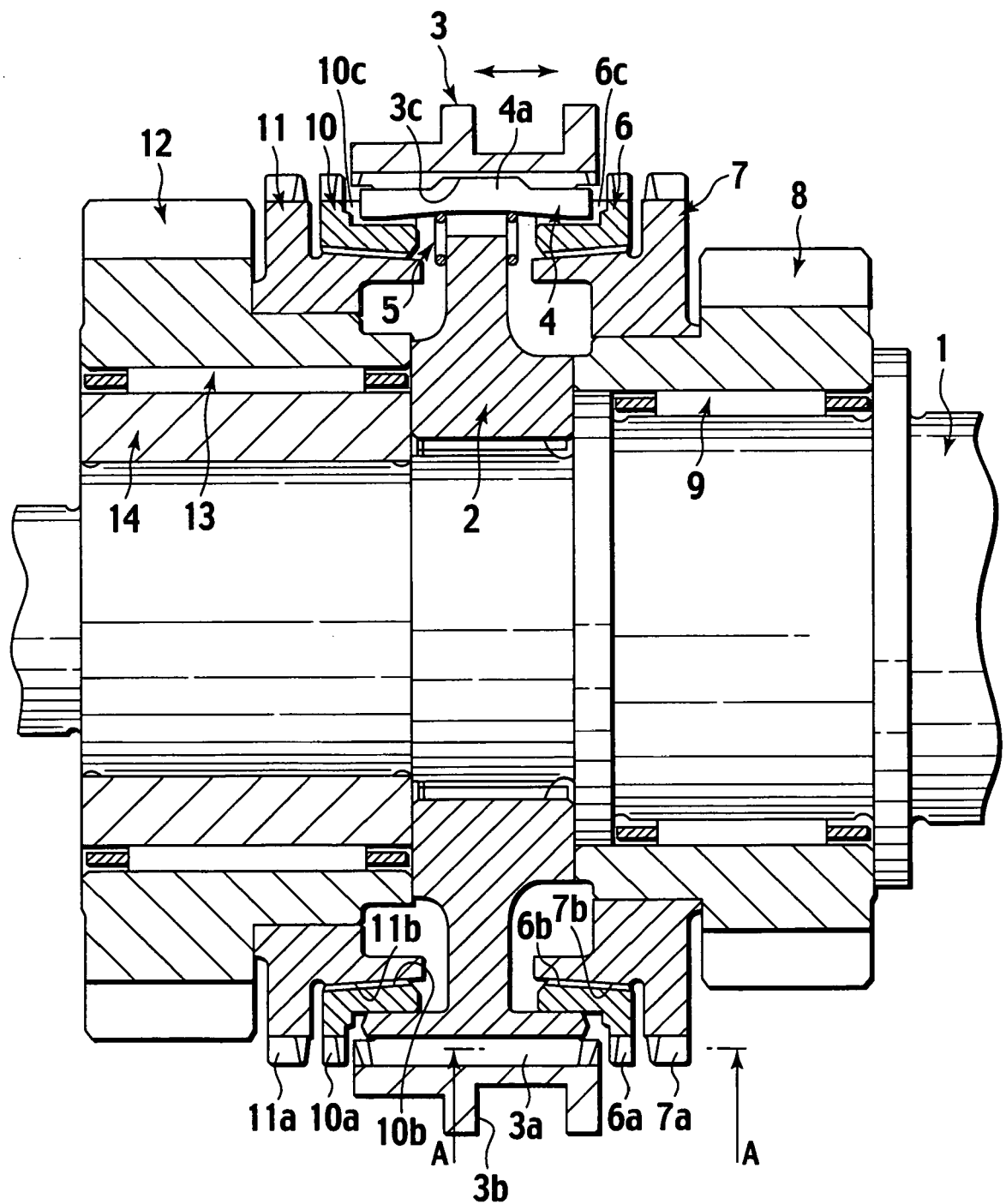
FIG. 1 is a sectional view showing a synchronizer for a transmission according to a first embodiment of the present invention.

Embodiments of the present invention will be explained below with reference to the drawings, wherein like members are designated by like reference characters.

First Embodiment

A synchronizer for a transmission according to a first embodiment includes a main shaft 1, a synchronizer hub 2, a synchronizer sleeve 3, insert keys 4, springs 5, a first synchro ring 6, a first clutch gear 7, a first gear 8 (an idle gear), a first bearing 9, a second synchro ring 10, a second clutch gear 11, a second gear 12, a second bearing 13, and a gear bush 14 as shown in FIG. 1.

The main shaft 1 is exemplified as a shaft member to which a rotating drive force is input from an engine, which has the synchronizer hub 2 spline-connected thereto at a synchronizing side. The first gear 8 and the second gear 12 to be synchronized are supported at both sides of the synchronizer hub 2 so as to be rotatable relative to the main shaft 1. The first bearing 9 is interposed between the first gear 8 and the main shaft 1, and the gear bush 14 and the second bearing 13 are interposed between the second gear 12 and the main shaft 1, respectively.

The synchronizer sleeve 3 is exemplified as a member used for inputting a transmission force, which is spline-connected to the synchronizer hub 2 and is slidable thereon in an axial direction of the main shaft 1. Synchronizer sleeve spline teeth 3a each having chamfers (sleeve chamfers) at both ends thereof are formed on an inner circumferential of the sleeve, and a fork groove 3b with which a shifting fork (not shown) is engaged is formed on an outer circumferential of the sleeve.

The insert keys 4 function in generating a synchronous friction torque by pressing the first synchro ring 6 or the second synchro ring 10 toward an axial direction during the shifting operation. Each of the insert keys 4 has a trapezoidal protrusion 4a formed on a central part of the outer periphery thereof, which is fit to one of trapezoidal grooves 3c formed in several positions of the inner circumferential of the synchronizer sleeve 3, while being biased radially outward by the spring 5. Each of the insert keys 4 extends along the synchronizer sleeve spline teeth 3a with both ends thereof positioned at key grooves 6c and 10c formed in the first synchro ring 6 and the second synchro ring 10, respectively.

The first synchro ring 6 is exemplified as a synchronizing member disposed between the synchronizer sleeve 3 and the first clutch gear 7. The first synchro ring 6 is provided on the outer periphery thereof with first synchro ring spline teeth 6a each having a chamfer (a synchro ring chamfer) that faces a chamfer of each synchronizer sleeve spline tooth 3a, a first synchro ring cone surface 6a defined by a concavo-convex surface on the inner periphery thereof, and first key grooves 6c on the outer periphery thereof at positions corresponding to the insert keys 4.

The first clutch gear 7 is exemplified as a synchronizing member that is press fitted to the first gear 8. The first clutch gear 7 is provided on the outer periphery thereof with first clutch gear spline teeth 7a each having a chamfer that faces one of the chamfers of the synchronizer sleeve spline teeth 3a, and a first clutch gear cone surface 7b at a position where the first synchro ring 6 is supported thereon.

The second synchro ring 10 is exemplified as a synchronizing member disposed between the synchronizer sleeve 3 and the second clutch gear 11. The second synchro ring 10 is provided with second synchro ring spline teeth 10a each having a chamfer that faces a chamfer of each synchronizer sleeve spline tooth 3a, a second synchro ring cone surface 10b defined by a concavo-convex surface on the inner periphery thereof, and second key grooves 10c on the outer periphery thereof at the positions corresponding to the insert keys 4.

The second clutch gear 11 is exemplified as a synchronizing member that is press fitted to the second gear 12. The second clutch gear 11 is provided on the outer periphery thereof with second clutch gear spline teeth 11a each having a chamfer that faces the chamfer of each synchronizer sleeve spline tooth 3a, and a second clutch gear cone surface 11b on the outer periphery thereof at a position where the second synchro ring 10 is supported.

Figure 2:
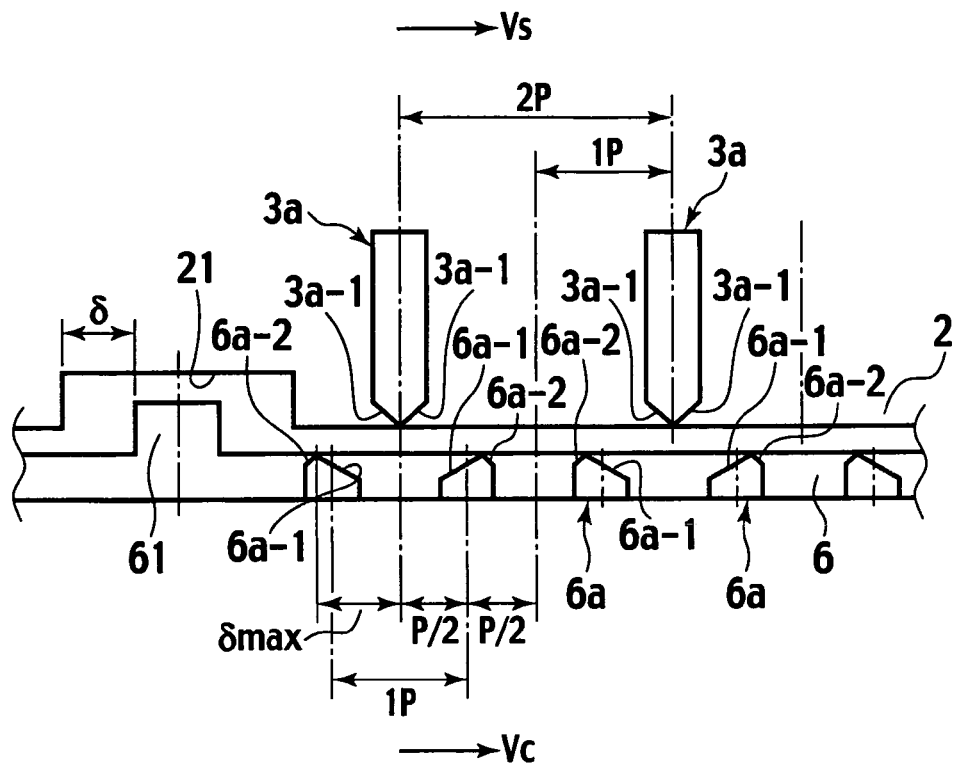
FIG. 2 is a partially development sectional view along lines A—A of FIG. 1 showing a synchronizer hub, synchronizer sleeve spline teeth, a first synchro ring and first synchro ring spline teeth provided in the synchronizer of the first embodiment.
Figure 3:
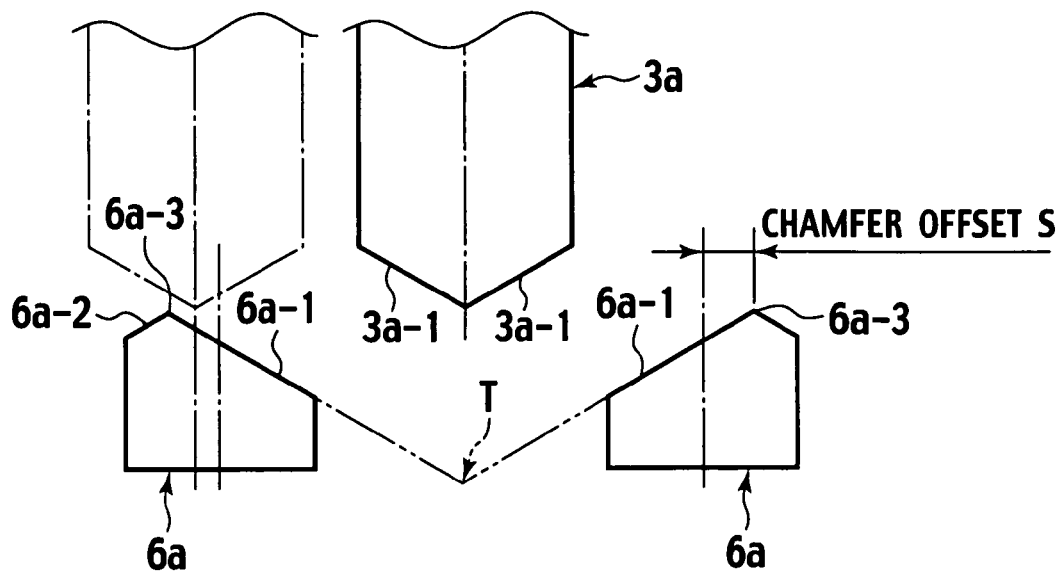
FIG. 3 is an enlarged view showing the synchronizer sleeve spline teeth and the first synchro ring spline teeth provided in the synchronizer of the first embodiment.

FIGS. 2 and 3 show the synchronizer hub 2, the synchronizer sleeve spline teeth 3a, the first synchro ring 6, and the first synchro ring spline teeth 6a in the synchronizer according to the first embodiment.

A concave portion 21 is formed in the outer peripheral flange of the synchronizer hub 2. A convex portion 61 is formed in the first synchro ring 6 so as to be engaged with the concave portion 21. Upon start of the shifting operation, the convex portion 61 makes a relative angular displacement by a distance corresponding to the circumferential gap (in the horizontal direction in FIG. 2) between the concave portion 21 and the convex portion 61. The convex portion 61 is then brought into abutment on the inner side surface of the concave portion 21. In the case where the synchronizer hub 2 (or synchronizer sleeve 3) and the first synchro ring 6 are in a neutral state, the convex portion 61 is positioned in the center of the width of the opening of the concave portion 21. The relative angular displacement stroke from the aforementioned neutral position to the abutment of the convex portion 61 on the inner surface of the concave portion 21 is designated as an index stroke δ.

The end surfaces of the synchronizer sleeve spline tooth 3a on the synchro ring side have sleeve chamfer surfaces 3a-1, 3a-1 which are symmetrical with respect to the center axis of the synchronizer sleeve spline tooth 3*a*. A peak portion that is a ridge line where the sleeve chamfer surfaces 3*a*-1, 3*a*-1 meet is positioned on the center axis. Referring to FIG. 3, offset chamfers are formed on the end surface of the first synchro ring spline tooth 6*a*, that is, a synchro ring chamfer surface 6*a*-1 with an area larger than half of the tooth width and a synchro ring chamfer surface 6*a*-2 with an area smaller than the half of the tooth width.

The offset chamfers are formed such that the synchro ring chamfer surfaces 6*a*-1 or 6*a*-2 of the adjacent first synchro ring spline teeth 6*a* are juxtaposed to each other.

A pair of the synchro ring chamfer surfaces 6*a*-1 formed on a pair of the adjacent first synchro ring spline teeth 6*a* form a trough portion T as an intersection of imaginary planes extended from the synchro ring chamfer surfaces 6*a*-1.

Each of the pair of the adjacent first synchro ring spline teeth 6*a* has, on the outside of the center axis in a circumferential direction, an edge portion (leading edge) where the synchro ring chamfer surfaces 6*a*-1 and 6*a*-2 meet. The interval between the pair of the edge portions of the first synchro ring spline teeth 6*a* is larger than one pitch of the first synchro ring spline teeth 6*a* to be described later. Referring to FIG. 2, in the case where the synchronizer sleeve 3 and the first synchro ring 6 are in the neutral state, the synchronizer sleeve spline teeth 3*a* are placed at angular positions defined by the pairs of the synchro ring chamfer surfaces 6*a*-1 that form the trough portion T.

Assuming that the distance between the centers of the first synchro ring spline teeth 6*a* adjacent to each other is defined as one pitch 1P, the synchronizer sleeve spline teeth 3*a* are arranged at a uniform interval of two pitches 2P.

The offset chamfers of the adjacent first synchro ring spline teeth 6*a* have the edge portions 6*a*-3, 6*a*-3 offset from the respective centers thereof on the outside thereof in the circumferential direction, and on the inside in the circumferential direction of the outer end surfaces of the first synchro ring spline teeth 6*a*, respectively. The distance between the center axis of the first synchro ring spline tooth 6*a* and the edge portion of the chamfer 6*a*-3 is designated as a chamfer offset amount S.

Operations of the synchronizer according to the first embodiment will be described.

[Synchronizing Operation]

The synchronizing operation performed by the synchronizer for the transmission according to the first embodiment will be described referring to FIGS. 1, 2, and 4A to 4D. Here, the shifting operation by moving the synchronizer sleeve 3 rightward as in FIG. 1, for matching the speed of rotation of the first gear 8 with that of the main shaft 1 so as to rotate them together will be described. It is assumed that the rotation speed of the synchronizer sleeve Vs is larger than the rotation speed of the synchro ring Vc, that is, Vs>Vc.

(a) Before Synchronization

In the neutral state before synchronization as shown in FIGS. 1 and 2, the synchronizer sleeve 3 rotates at the engine rotation speed Vs, and the first clutch gear 7 rotates at the rotation speed Vc which depends on the vehicle running speed. The first synchro ring rotates at the same speed as that of the synchronizer sleeve 3. The first synchro ring cone surface 6*a* is not in contact with the first clutch gear cone surface 7*b*.

(b) Synchronizing Operation

Figure 4A:
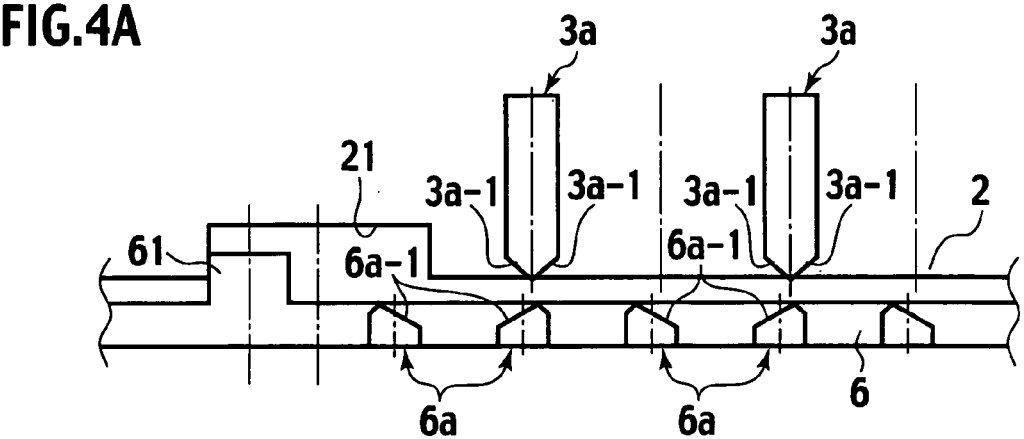
FIGS. 4A to 4D are views illustrating synchronous shifting operations performed by the synchronizer of the first embodiment.

When the synchronizer sleeve 3 is displaced rightward from the neutral state before synchronization upon operation of the shift lever or the actuator via the shift fork as shown in FIG. 1, the insert keys 4 press the first synchro ring 6. The pressed first synchro ring 6 moves to bring the first synchro ring cone surface 6*b* into contact with the first clutch gear cone surface 7*b*. Referring to FIG. 4A, the first synchro ring 6 rotates following the rotation of the first clutch gear 7. Accordingly it makes the relative angular displacement (indexing) by the distance corresponding to the gap between the inner side surface of the concave portion 21 and the convex portion 61. The sleeve chamfer surfaces 3*a*-1 of the synchronizer sleeve spline teeth 3*a* are then brought into the positions to face the synchro ring chamfer surfaces 6*a*-1 of the first synchro ring spline teeth 6*a*, that is, those chamfer surfaces are overlapped in angular position and in radial position. The aforementioned state is designated as an "indexing state".

Figure 4B:
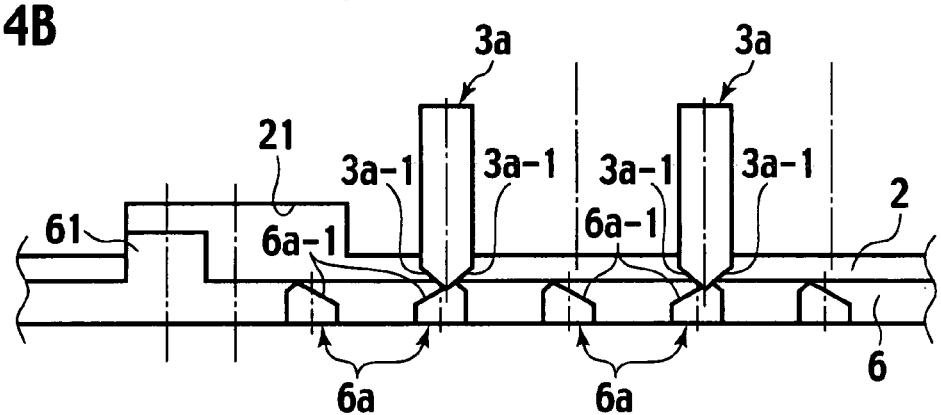

As the synchronizer sleeve 3 further displaces rightward, the sleeve chamfer surfaces 3*a*-1 of the synchronizer sleeve spline teeth 3*a* come in contact with the synchro ring chamfer surfaces 6*a*-1 of the first synchro ring spline teeth 6*a* as shown in FIG. 4B, thus starting synchronization. The aforementioned state is designated as a "synchronizing state".

Figure 4C:
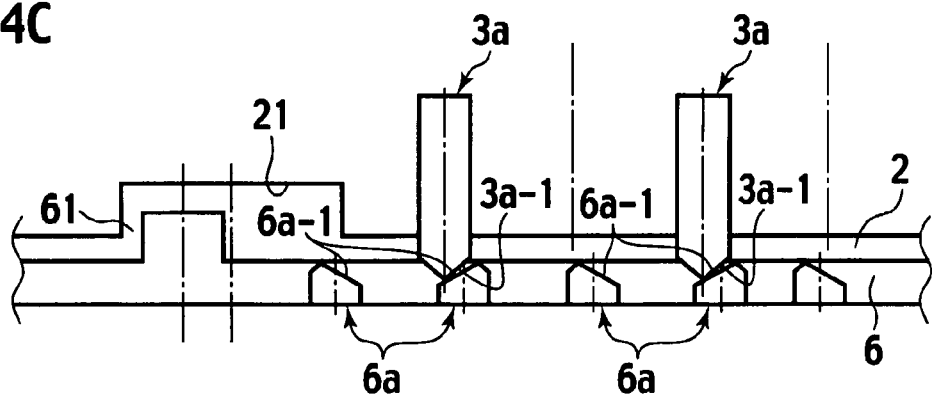

The synchronization friction torque generated between the first synchro ring cone surface 6*b* and the first clutch gear cone surface 7*b* functions in reducing the difference in the rotating number between the first synchro ring 6 and the first clutch gear 7. Referring to FIG. 4C, the force generated by the sliding contact between the sleeve chamfer surfaces 3*a*-1 of the synchronizer sleeve spline teeth 3*a* and the synchro ring chamfer surfaces 6*a*-1 of the first synchro ring spline teeth 6*a*, is divided into the component force that presses the first synchro ring 6 in a direction parallel to the direction of the displacement of the synchronizer sleeve 3, and the component force that rotates the first synchro ring 6 relative to the synchronizer sleeve 3.

The sliding amount (work load) of the sleeve chamfer surfaces 3*a*-1 of the synchronizer sleeve spline teeth 3*a* that slide on the synchro ring chamfer surfaces 6*a*-1 each having an area larger than half of the tooth width of each first synchro ring spline tooth 6*a*, function in eliminating the difference in the rotating number between the first synchro ring 6 and the first clutch gear 7. When the rotation speed of the first synchro ring 6 becomes identical to that of the first clutch gear 7, the synchronizing operation ends.

(c) After Synchronization

Figure 4D:
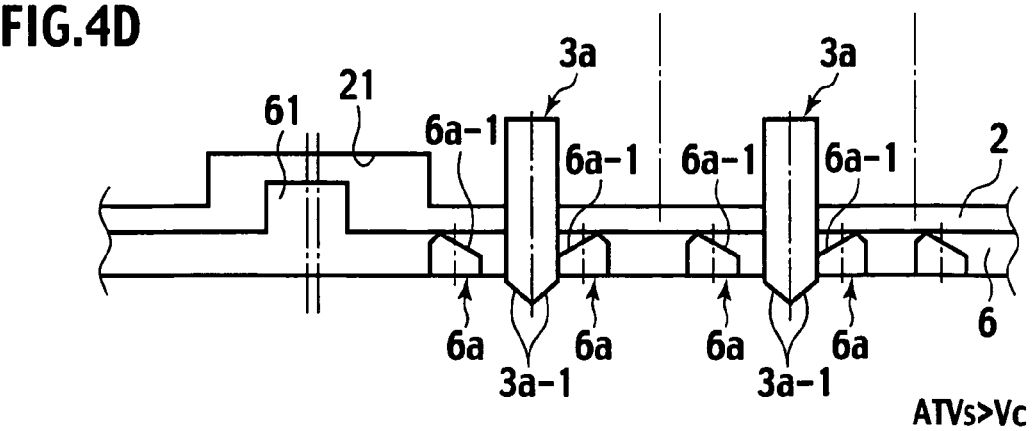

When the difference in the rotation speed between the first synchro ring 6 and the first clutch gear 7 is eliminated upon completion of the synchronizing operation, the constrained synchronizer sleeve 3 is released to start displacement. Referring to FIG. 4D, the synchronizer sleeve spline teeth 3*a* move down in contact with the first synchro ring spline teeth 6*a*.

After moving down while being in contact with the first synchro ring spline teeth 6*a*, the synchronizer sleeve spline teeth 3*a* further move in contact with the first clutch gear spline teeth 7*a* to complete the engagement therewith. The shifting operation, thus, ends.

In the synchronizer disclosed in JP-A-6-58344, the short spline teeth for synchronization and the long spline teeth for engagement are alternately arranged to form the synchronizer sleeve spline teeth. In the case where the synchronizer sleeve and the synchro ring are in the neutral state as shown in FIG. 5A, the spline teeth for synchronization are formed at angular positions corresponding to the peak portions defined by chamfer surfaces of the adjacent synchro ring spline teeth.

Figure 5A:
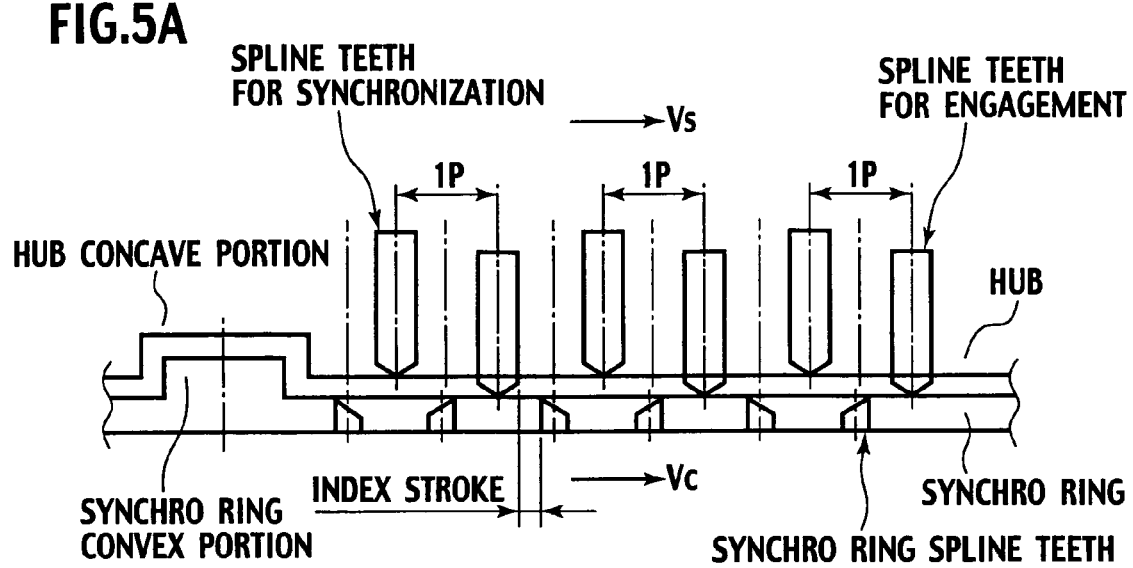
FIGS. 5A to 5D are views showing the structure and synchronous shifting operation of a synchronizer as a comparative example.
Figure 5B:
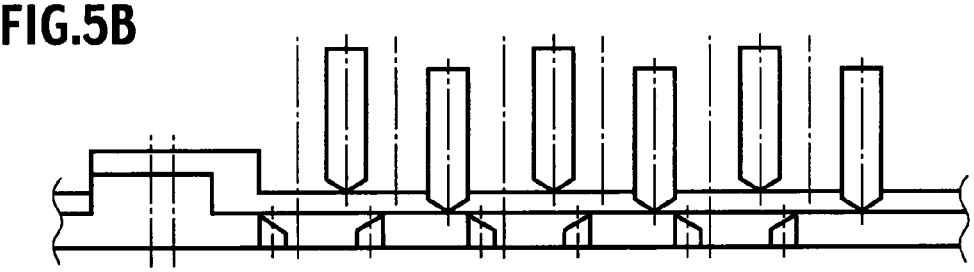
Figure 5C:
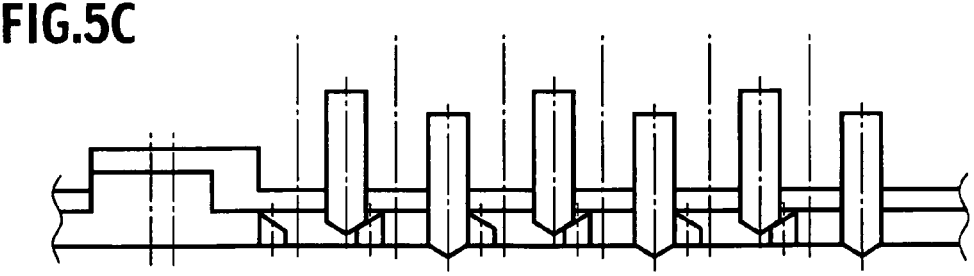
Figure 5D:
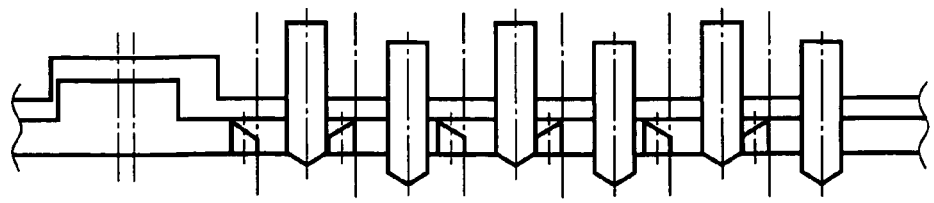

In the aforementioned synchronizer, assuming that the rotation speed of the synchronizer sleeve Vs is higher than the rotation speed of the synchro ring Vc, that is, Vs>Vc, the synchronizing operation is performed through such stages as the neutral state as shown in FIG. 5A, the indexing state as shown in FIG. 5B, the synchronizing state as shown in FIG. 5C, and the insertion state as shown in FIG. 5D. The aforementioned synchronizer, however, has the following problems.

Problem 1

The index stroke δ of the synchro ring is represented as the stroke of relative angular displacement corresponding to the gap between the side surface of each synchro ring spline tooth on the side of the peak portion and the side surface of each sleeve spline tooth for engagement. The index stroke δ thus becomes equal to or smaller than the half pitch of the synchro ring spline teeth.

Problem 2

If the aforementioned synchronizer is applied to the system that requires the index stroke δ that is equal to or larger than the half pitch, or to the system having the pitch larger than the half pitch owing to the wear of the synchro ring, it is possible that the synchro ring is locked and stuck, that is, the synchronizer sleeve spline teeth are not capable of moving down being blocked by the synchro ring spine teeth.

Problem 3

Figure 7A:
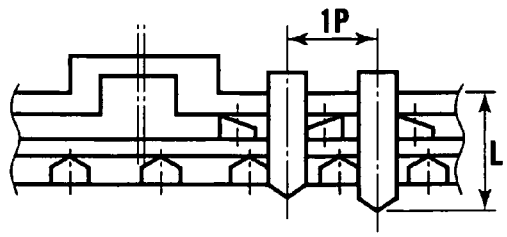
FIGS. 7A and 7B are views showing the increasing shift stroke in the synchronizer as the comparative example when the number of the synchro ring spline teeth is reduced.
Figure 7B:
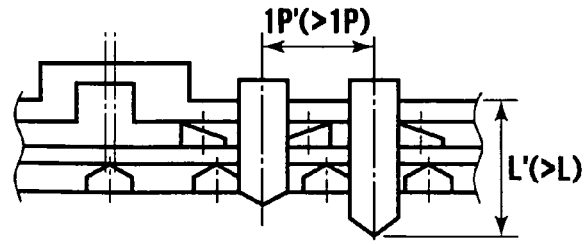

For increasing the index stroke δ, the number of the synchro ring spline teeth has to be decreased so as to make one pitch 1P wider (1P'>1P) as shown in FIGS. 7A and 7B. In this case, the change in the number of the teeth of the synchro ring may cause the module of the synchronizer sleeve or the clutch gear to be changed. Accordingly the shift stroke has to be increased from L shown in FIG. 7A to L' shown in FIG. 7B in order to obtain the margin for securing engagement of the synchronizer sleeve with the clutch gear.

[Increase in index stroke δ]

In the synchronizer of the first embodiment, the first synchro ring spline teeth 6a have the offset chamfers each having the edge portion 6a-3 on the outer side of the center axis of each spline tooth. One of the offset chamfer surfaces 6a-1 forms the trough portion T together with the offset chamfer surface 6a-1 of the adjacent tooth. The synchronizer sleeve spline teeth 3a are positioned only in the center of the angular space between the pair of the synchro ring chamfer surfaces 6a-1 that form the trough portion T when the synchronizer sleeve 3 and the first synchro ring 6 are in the neutral position.

In the synchronizer of the first embodiment, the synchro ring chamfer surfaces 6a-1 and 6a-2 of each of the first synchro ring spline teeth 6a form an offset chamfer having the edge portion 6a-3 on the outer side of the center axis of each spline tooth. The maximum index stroke δmax of the first synchro ring 6 is obtained by adding the chamfer offset amount S extended from the center axis of each first synchro ring spline tooth 6a to the width equivalent to half of the pitch of the first synchro ring spline teeth 6a. This makes it possible to increase the index stroke δ of the first synchro ring 6 without changing the pitch of the first synchro ring spline teeth 6a or increasing the shift stroke.

The displacement amount (index stroke δ) of the first synchro ring 6 may be made larger than the one in the generally employed system. The sliding amount (work load) of the sleeve chamfer surface 3a-1 that slides on the synchro ring chamfer surface 6a-1 with the area larger than the half of the width of each first synchro ring spline tooth 6a becomes large. Accordingly the first gear 8 is completely synchronized so as to improve the durability against the gear squeak.

The effect of the synchronizer will be described.

In the synchronizer for a transmission of the first embodiment, the following effects may be obtained.

(1) Application of the pressing force to the first synchro ring 6 along with the displacement of the synchronizer sleeve 3 brings the chamfers of the synchronizer sleeve spline teeth 3a to be in contact with that of the first synchro ring spline teeth 6a. The friction torque is then generated between the first synchro ring cone surface 6b and the first clutch gear cone surface 7b to start synchronization. In the synchronizer where the shifting is performed upon movement of the synchronizer sleeve spline teeth 3a in contact with the first synchro ring spline teeth 6a, the index stroke δ of the synchro ring 6 may be increased and the durability against gear squeak may be improved. This is because the first synchro ring spline teeth 6a have the offset chamfer with the edge portion on the outside of the center axis of each spline tooth, and one of the chamfer surfaces forms the trough portion T together with the chamfer surface 6a-1 of the adjacent spline tooth 6a. The synchronizer sleeve spline tooth 3a is disposed only in the center of the space defined by the pair of the synchro ring chamfer surfaces 6a-1 that form the trough portion T when the synchronizer sleeve 3 and the first synchro ring 6 are in the neutral state.

(2) Assuming that the distance between the centers of the adjacent first synchro ring spline teeth 6a is set to one pitch 1P, the first synchro ring spline teeth 6a are arranged at the uniform interval of one pitch 1P. Meanwhile, the synchronizer sleeve spline teeth 3a are arranged at the uniform interval of two pitches 2P. The decrease in the number of the synchronizer sleeve spline teeth 3a may be minimized.

(3) The offset chamfer of the first synchro ring spline tooth 6a includes the edge portion 6a-3 offset from the center axis of the first synchro ring spline tooth 6a at the position inside of the outer end surface of the first synchro ring spline tooth 6a. This makes it possible to set the angle of the edge portion 6a-3 to a relatively larger value, obtuse angle equal to or higher than 90°, for example, resulting in enhanced contact strength between the chamfers. Additionally the request for increase in the index stroke δ may be satisfied by adjusting the chamfer offset amount S.

[Second Embodiment]

In the synchronizer according to the second embodiment, the offset chamfer of the synchro ring spline tooth has a single chamfer surface.

Figure 8:
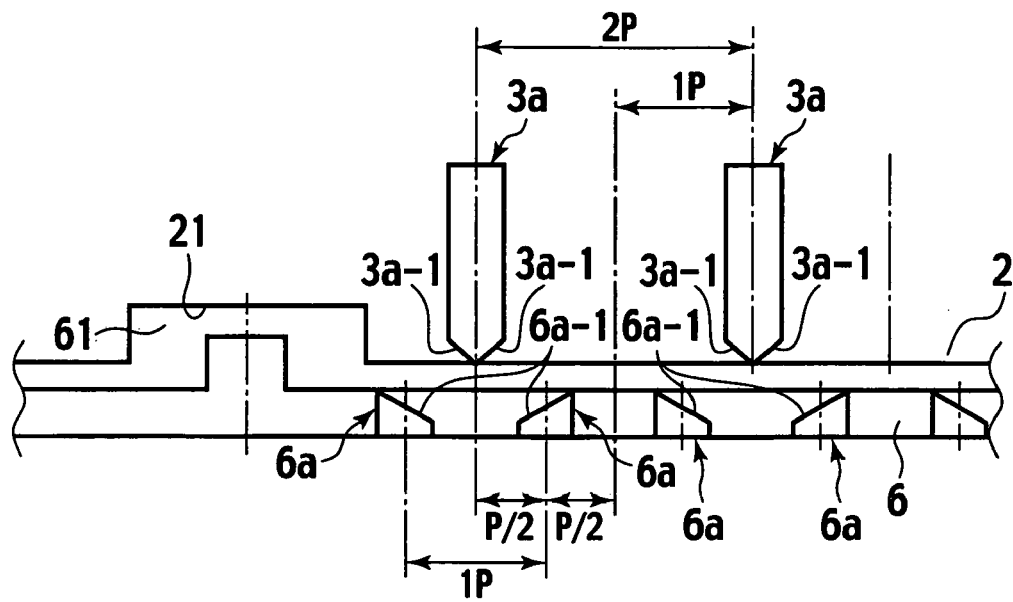
FIG. 8 is a partially development sectional view corresponding to FIG. 2, showing a synchronizer hub, synchronizer sleeve spline teeth, a first synchro ring and first synchro ring spline teeth provided in the synchronizer according to a second embodiment of the invention.
Figure 9:
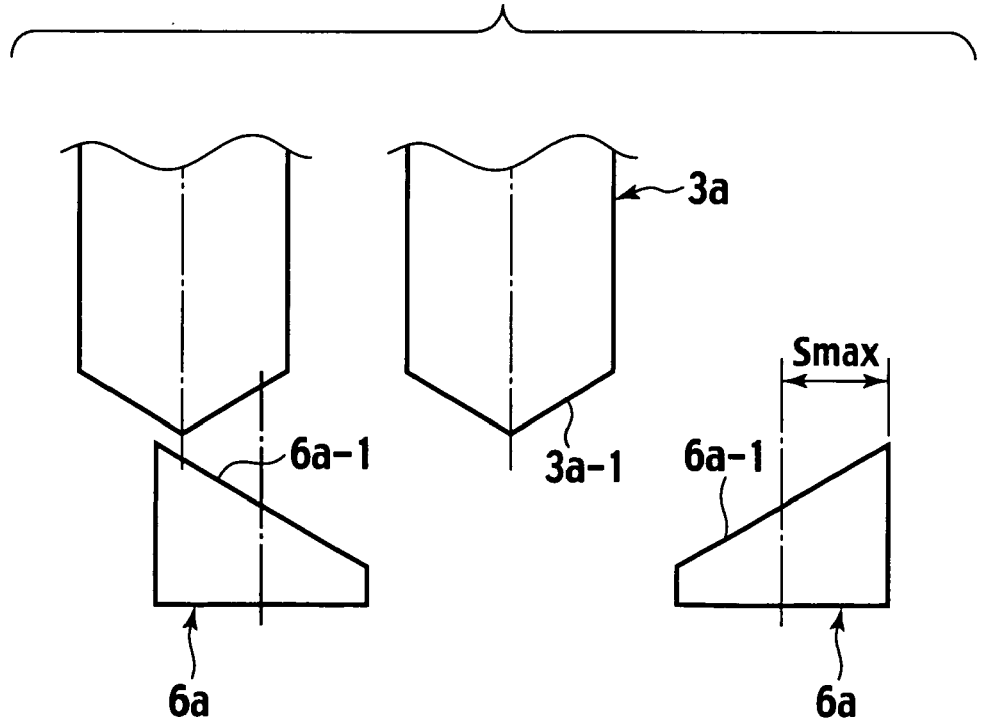
FIG. 9 is an enlarged view showing the synchronizer sleeve spline teeth and the first synchro ring spline teeth provided in the synchronizer of the second embodiment.

Referring to FIGS. 8 and 9, each offset chamfer of the first synchro ring spline teeth 6a has the edge portion 6a-3 as the outer end surface of a pair of adjacent first synchro ring spline teeth 6a. In this embodiment, the chamfer of the first synchro ring spline tooth 6a has only a synchro ring chamfer surface 6a-1, and has no chamfer surface 6a-2 as in the first embodiment. As other structure is the same as that of the first embodiment, the same elements will be designated as the same reference numerals, and the explanation thereof, thus, will be omitted.

In the synchronizer of the second embodiment, the offset chamfer of the first synchro ring spline tooth 6a has a single chamfer surface. This makes it possible to set the offset amount to the maximum value Smax. If each of the first synchro ring spline teeth 6a has the same pitch, and the initial setting for the index stroke δ is also the same, the margin for the maximum index stroke δ max may be preliminarily obtained.

Figure 6:
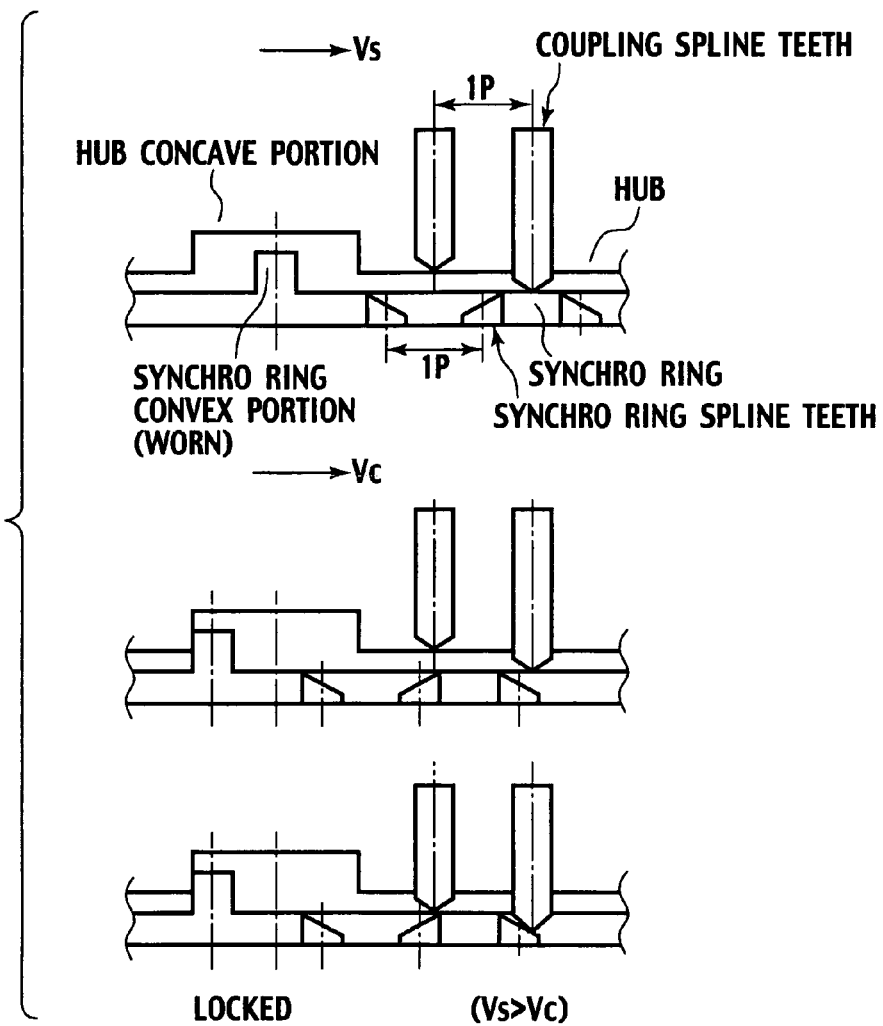
FIG. 6 is a view representing a lock or stuck state in the synchronizer as the comparative example.

In the case where friction or collapse in the concave portion 21 and the convex portion 61 is caused by the use for an extended period of time, frequent shifting operation and the like, the index stroke δ may become larger than the initially set index stroke δ. The synchronizer of this embodiment makes it possible to cover the increase in the index stroke δ by the maximum margin so as to prevent the lock state as shown in FIG. 6. Other operations are the same as those of the first embodiment, and the explanation thereof will be omitted.

The effect of the synchronizer of the embodiment will be described. In addition to the effects (1) and (2) of the first embodiment, the following effect may be obtained.

(4) Each offset chamfer of the first synchro ring spline teeth 6a has the edge portion 6a-3 as the outer end surface thereof. Accordingly the margin of the index stroke δ may be set to the maximum value. Even when the friction or collapse in the concave portion 21 and the convex portion 61 occurs, the resultant increase in the index stroke δ may be covered by the margin.

[Third Embodiment 3]

The synchronizer according to the third embodiment serves to adjust the work load as the sliding amount of the chamfer surfaces of the synchronizer sleeve spline tooth and the synchro ring spline tooth in contact with each other upon synchronization.

Figure 10A:
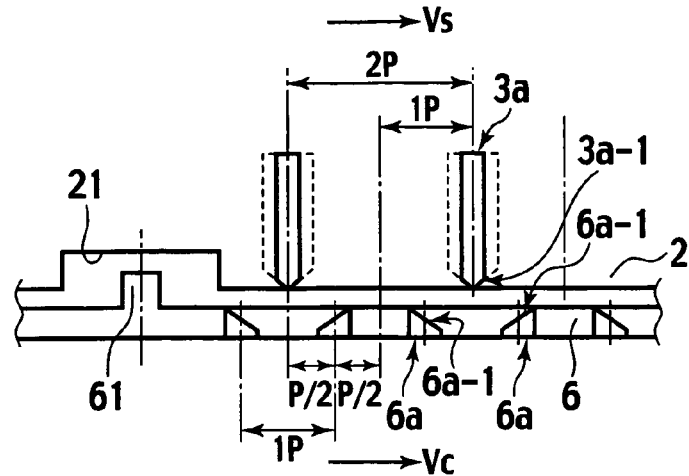
FIGS. 10A to 10E are views showing the structure and synchronous shifting operation of a synchronizer for a transmission according to a third embodiment of the invention.

The basic structure of the synchronizer of the third embodiment is the same as that of the second embodiment. Each thickness of the synchronizer sleeve spline tooth 3a and the first synchro ring spline tooth 6a is reduced as shown in FIG. 10A such that each area of the sleeve chamfer surface 3a-1 and the synchro ring chamfer surface 6a-1 is reduced to be smaller than that in case of the second embodiment as shown by the dashed line. The third embodiment represents a modified example to cope with the work load determined as being excessively high owing to the tooth thickness set in the second embodiment. In this case, each area of the chamfer surfaces 3a-1, 6a-1 is reduced. As other structure of the synchronizer of the third embodiment is the same as that of the first embodiment, the same elements are designated as the same reference numerals. The explanation of the aforementioned elements, thus, will be omitted.

Figure 10B:
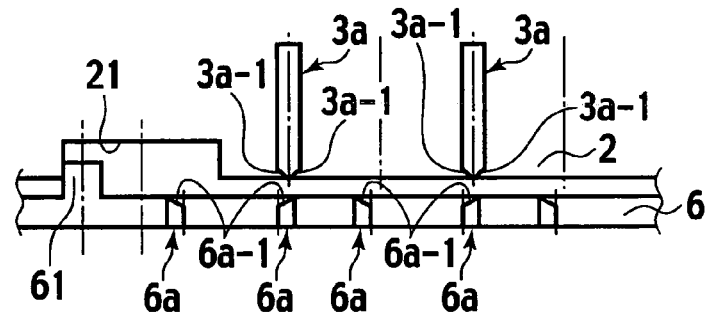
Figure 10C:
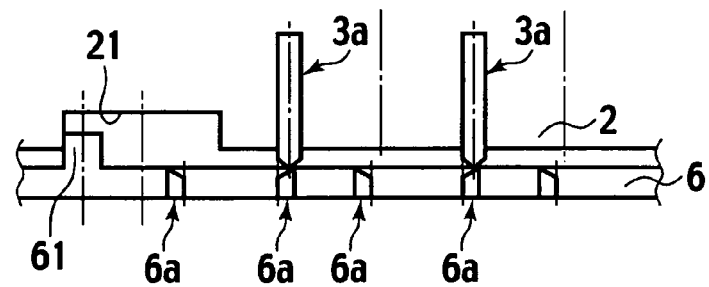
Figure 10D:
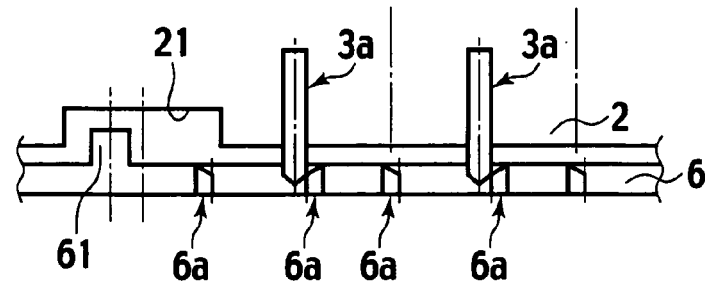
Figure 10E:
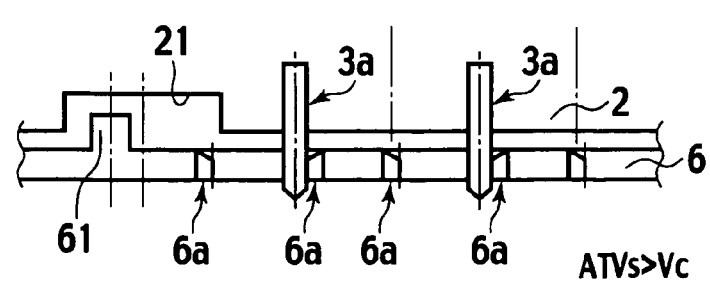

Assuming that the rotation speed of the synchronizer sleeve Vs is higher than the rotation speed of the synchro ring Vc, that is, Vs>Vc, in the synchronizer of the third embodiment, the synchronization is performed through the stages of the neutral state as shown in FIG. 10A, the index state as shown in FIG. 10B, the synchronizing state as shown in FIG. 10C, the slide synchronization state as shown in FIG. 10D, and the insertion state as shown in FIG. 10E, respectively. In the synchronizer of the third embodiment, each area of the chamfer surfaces 3a-1, 6a-1 is reduced so as to reduce the sliding amount of each of the chamfer surfaces 3a-1, 6a-1. In the case where the work load is excessively high resulting from the tooth width set in the second embodiment, the adjustment for reducing the work load is made for synchronous rotation. Other operations of this embodiment are the same as those of the first embodiment, and the explanation thereof, thus, will be omitted.

The effect of the synchronizer will be described.

The effects of the synchronizer of the third embodiment is applicable to the first and the second embodiments, the following effect may be obtained in addition to the effects (1), (2), (3) derived from the first embodiment, and the effect (4) derived from the second embodiment.

(5) The tooth thickness of at least one of the synchronizer sleeve spline tooth 3a and the first synchro ring spline 6a is set such that the contact between the chamfer surfaces 3a-1, 6a-1 corresponds to the required work load of chamfer surfaces in the sliding state. This makes it possible to make an adjustment in accordance with the required work load by adjusting the tooth width in the case where the work load is excessively large or excessively small for the sliding contact between the chamfer surfaces 3a-1 and 6a-1. Accordingly the complete synchronization by the sliding of the chamfer surfaces 3a-1 and 6a-1 may be established while restraining the operation load (shifting operation in the case of manual transmission, transmission actuator drive torque in the case of automatic transmission) at minimum.

[Fourth Embodiment]

In the synchronizer according to the fourth embodiment, each number of the synchronizer sleeve spline teeth and the synchro ring spline teeth is reduced.

Figure 11:
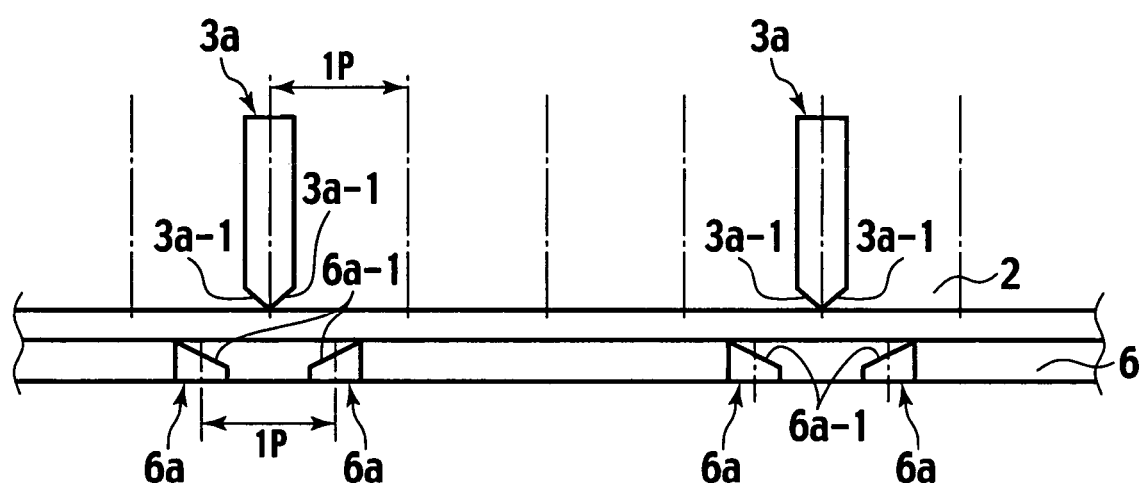
FIG. 11 is an enlarged view showing synchronizer sleeve spline teeth and first synchro ring spline teeth in a synchronizer for a transmission according to a fourth embodiment of the invention.

Assuming that the distance between the centers of the adjacent first synchro ring spline teeth 6a is set to one pitch 1P, the first synchro ring spline teeth 6a are arranged at a uniform interval of one pitch 1P as shown in FIG. 11. Meanwhile, the synchronizer sleeve spline teeth 3a are arranged at a uniform interval of 4 pitches. Other structure of the synchronizer of the fourth embodiment is the same as that of the second embodiment. The same elements are designated as the same reference numerals, and explanations thereof, thus, will be omitted. As the operation of the synchronizer of this embodiment is the same as that of the second embodiment, the explanation of the operation will also be omitted.

The effect of the synchronizer of the fourth embodiment will be described.

The following effect of the fourth embodiment may be obtained in addition to the effect (1) of the first embodiment.

(6) Assuming that the distance between the centers of the adjacent first synchro ring spline teeth 6a is set to one pitch 1P, the first synchro ring spline teeth 6a are arranged at a uniform interval of one pitch 1P. Meanwhile, the synchronizer sleeve spline teeth 3a are arranged at a uniform interval of 4 pitches. Upon shifting operation between the shift speeds at the relatively low synchronizing friction torque, the index stroke δ of the first synchro ring δ may be increased without changing the pitch of the first synchro ring spline teeth 6a with a simple structure with reduced numbers of the synchronizer sleeve spline teeth 3a and the first synchro ring spline teeth 6a. Additionally, the durability against gear squeak may also be enhanced.

[Fifth Embodiment]

In the synchronizer according to the fifth embodiment, the index stroke δ is increased by forming the concavo-convex portions on the synchronizer hub and the synchro ring so as to bear a part of the sliding work, thus reducing the shifting operation load.

The concave portion 21 formed in the synchronizer hub 2 spline-connected to the synchronizer sleeve 3 and the convex portion 61 formed in the first synchro ring 6 are formed into trapezoidal shapes each having inclined surfaces 21a, 61a where the component force that presses the synchro ring in the axial direction is generated by the relative angular displacement of the synchronizer hub 2 and the first synchro ring 6 in contact with each other. As other structure of the synchronizer of the fifth embodiment is the same as that of the first embodiment, the same elements are designated as the same reference numerals. The explanation of those elements, thus, will be omitted.

Figure 12:
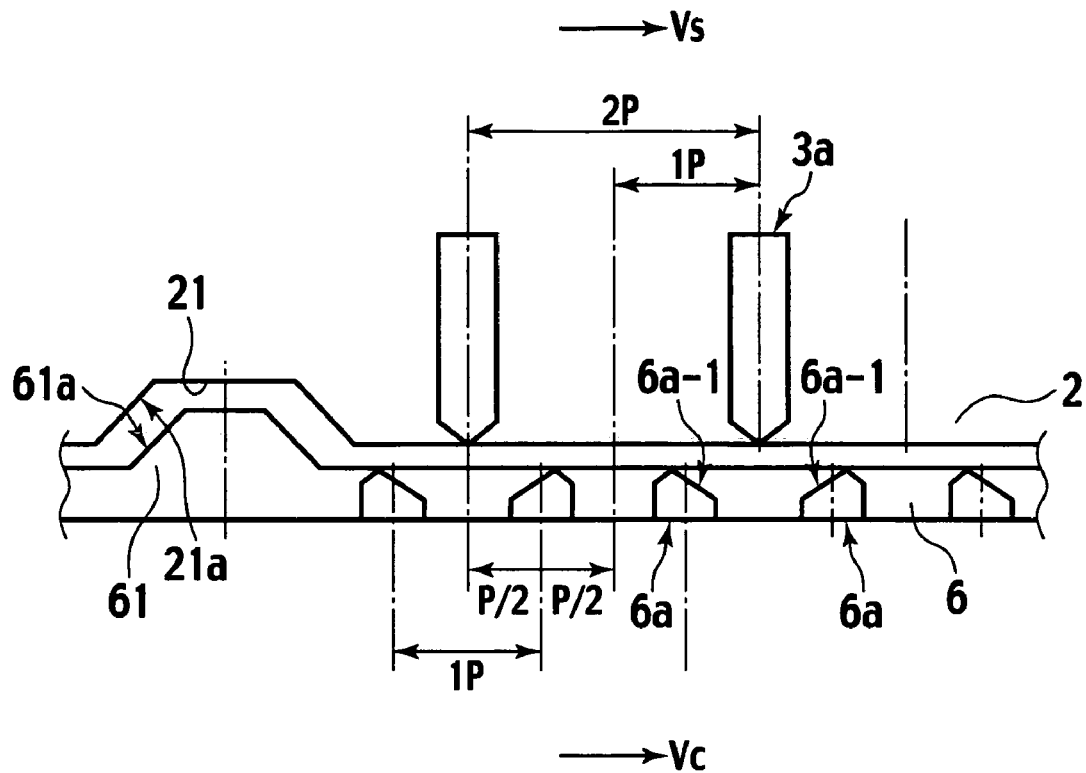
FIG. 12 is a partially development sectional view corresponding to FIG. 2, showing a synchronizer hub, synchronizer sleeve spline teeth, a first synchro ring and first synchro ring spline teeth provided in a synchronizer according to a fifth embodiment of the invention.
Figure 13:
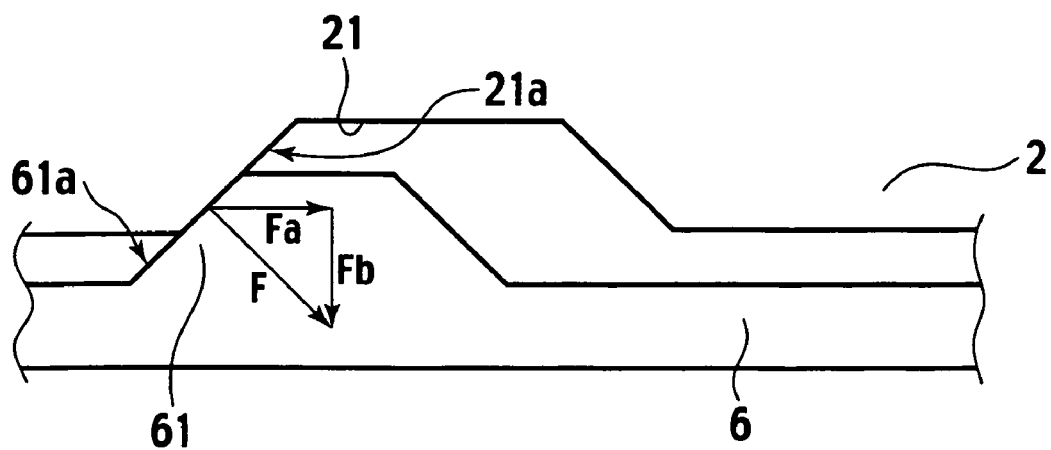
FIG. 13 is a view showing component forces for indexing between a concave portion formed in the hub and a convex portion formed in the synchro ring in the synchronizer of the fifth embodiment.
Figure 14A:
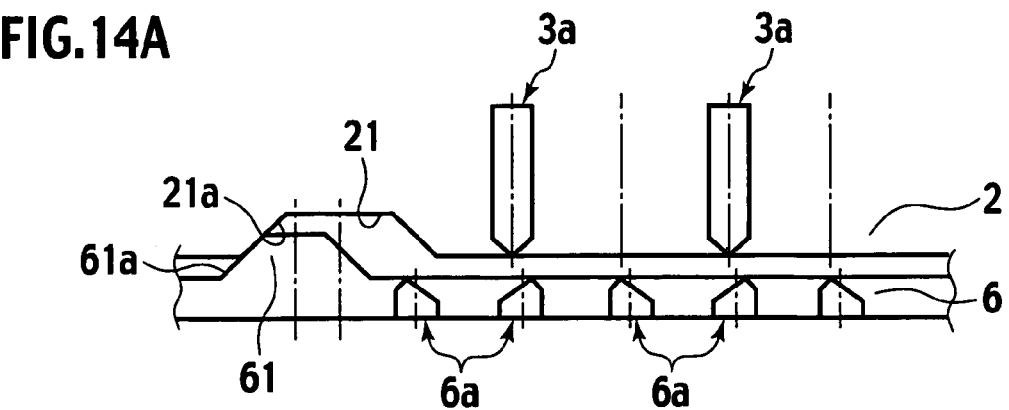
FIGS. 14A to 14D are views showing the synchronous shifting operations performed by the synchronizer of the fifth embodiment.
Figure 14B:
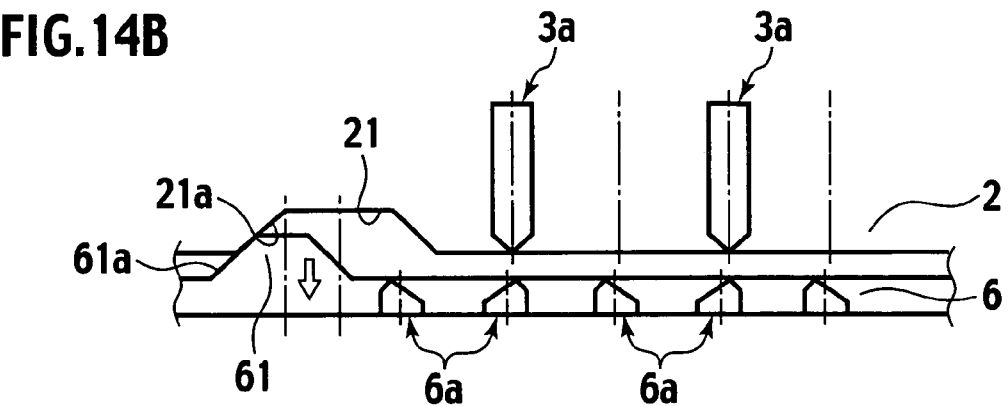

Assuming that the rotation speed of the synchronizer sleeve Vs is higher than the rotation speed Vc of the synchro ring, that is, Vs>Vc, in the synchronizer of the fifth embodiment, the synchronizer sleeve 3 displaces rightward in the neutral state in the direction shown in FIG. 12. As the synchronizer sleeve 3 displaces, the insert key 4 presses the first synchro ring 6. Accordingly the friction torque is generated between the cone surface 6a of the first synchro ring 6 and the cone surface 7a of the first clutch gear 7. The first synchro ring 6 rotates following the rotation of the first clutch gear 7 at the friction torque generated between the cone surfaces 6a and 7a. Accordingly the rotation speed of the synchronizer hub 2 becomes different from that of the synchro ring 6 such that the concave portion 21 formed in the synchronizer hub 2 is brought into contact with the convex portion 61 formed in the first synchro ring 6, that is, the first synchro ring 6 is in the indexing state as shown in FIG. 14A. In the aforementioned case, the force F perpendicular to the inclined contact surfaces 21a, 61a is applied to the first synchro ring 6 from the synchronizer hub 2 as shown in FIG. 13. The force F is divided into a circumferential component force Fa and an axial component force Fb. The first synchro ring 6 is displaced in the axial direction by the axial component force Fb, and on the inclined contact surface 21a of the convex portion 21 in the circumferential sliding direction as shown in FIG. 14B. The index stroke δ, thus, is increased.

Figure 14C:
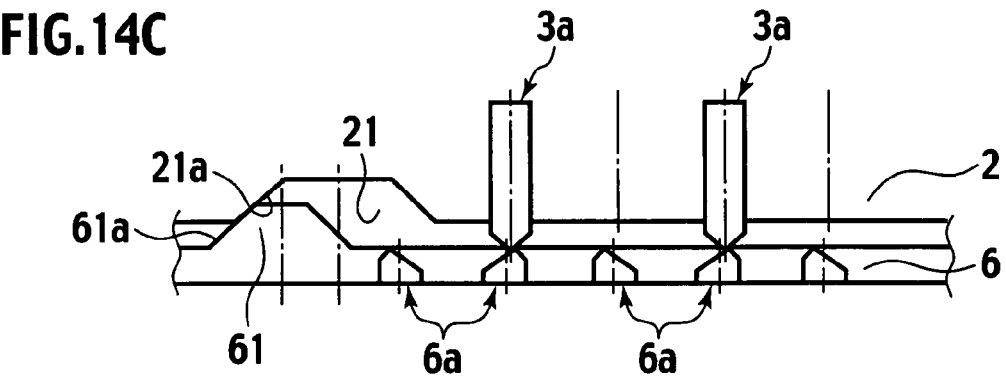
Figure 14D:
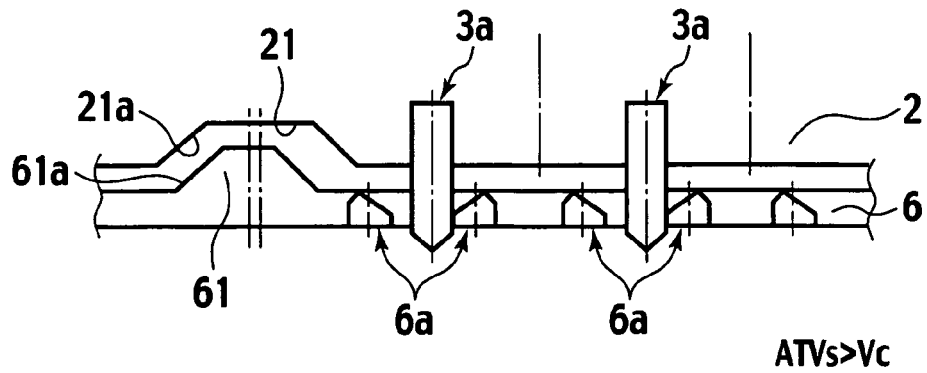

As the first synchro ring 6 displaces in the axial direction, the synchronizing friction torque is generated between the cone surfaces 6a and 7a of the first synchro ring 6 and the first clutch gear 7, respectively. The force of the sleeve chamfer surface 3a-1 for pressing the synchro ring chamfer surface 6a-1 is reduced. The shifting synchronizing operation is performed through the synchronizing state as shown in FIG. 14C and the insertion state as shown in FIG. 14D.

In the synchronizer of the third embodiment, as the first synchro ring 6 displaces in the axial direction, the synchronizing friction torque is generated between the cone surfaces 6a and 7a of the first synchro ring 6 and the first clutch gear 7, respectively. Accordingly the force of the sleeve chamfer surface 3a-1 for pressing the synchro ring chamfer surface 6a-1 is reduced. As a result, the operation load (the shifting operation force for the manual transmission, the shifting actuator driving torque for the automatic MT) may be reduced. Other functions are the same as those of the first embodiment, and the explanation thereof, thus, will be omitted.

The effect of the synchronizer will be described.

As the synchronizer of the fifth embodiment is applicable to any one of the embodiments 1, 2, 3, and 4, the following effect may be obtained in addition to the effects (1), (2), (3) derived from the first embodiment, and the effects (4) derived from the second embodiment, the effect (5) derived from the third embodiment, the effect (6) derived from the fourth embodiment.

(7) The concave portion 21 formed in the synchronizer hub 2 spline-connected to the synchronizer sleeve 3 and the convex portion 61 formed in the first synchro ring 6 in contact with each other at a relative angular displacement are formed into trapezoidal shapes each having the inclined contact surface 21a, 61a at which the component force Fb that presses the first synchro ring 6 in the axial direction is generated. As the first synchro ring 6 displaces in the axial direction during indexing, the operation load applied to the synchronizer sleeve 3 functions in reducing the force of the sleeve chamfer surface 3a-1 to press the synchro ring chamfer surface 6a-1. Accordingly the operation load may be reduced.

[Sixth Embodiment]

In the synchronizer according to the sixth embodiment, the work load at downshifting is made different from that at upshifting.

Figure 15A:
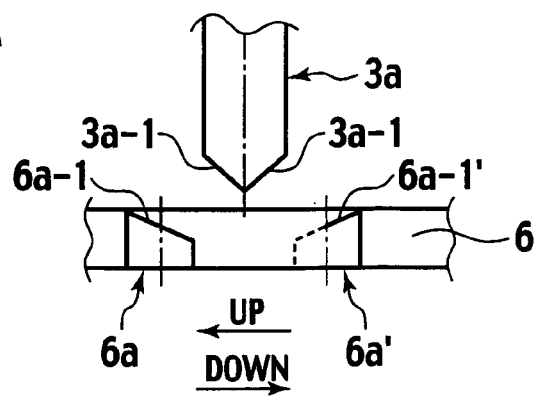
FIG. 15A is an enlarged view showing a synchronizer sleeve spline tooth and first synchro ring spline teeth in a synchronizer for a transmission according to a sixth embodiment of the invention.
Figure 15A:
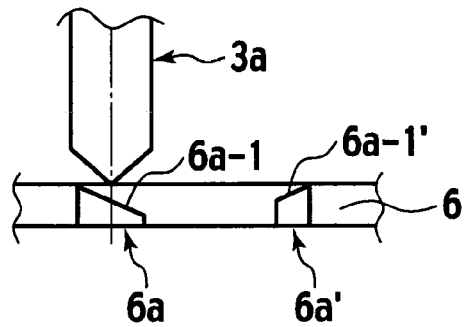

Referring to FIGS. 15A and 15B, the tooth thickness of one of a pair of the first synchro ring spline teeth 6a, which is in contact with the sleeve chamfer surface 3a-1 at downshifting is set to the synchro ring chamfer surface 6a-1 with a large width. Meanwhile, the tooth thickness of the other first synchro ring spline tooth 6a which is in contact with the sleeve chamfer surface 3a-1 at upshifting is set to the synchro ring chamfer surface 6a-1' with a small width.

Figure 16A:
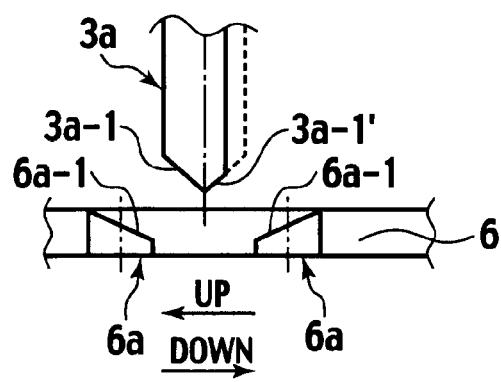
FIG. 16A is an enlarged view showing the synchronizer sleeve spline tooth and the first synchro ring spline teeth in the synchronizer as another example of the sixth embodiment.
Figure 16A:
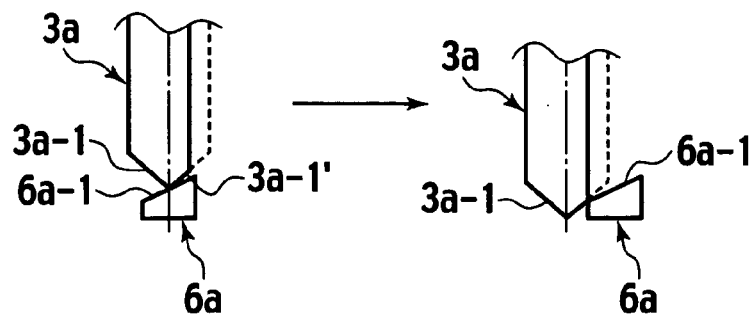

Referring to FIGS. 16A and 16B, each of the pair of the first synchro ring spline teeth 6a has the same thickness. The tooth thickness of one of a pair of the sleeve chamfer surfaces 3a-1, 3a-1 formed on the top surface of the synchronizer sleeve spline tooth 3a, which is in contact with the first synchro ring chamfer surface 6a-1 at downshifting may be set to a large width. Meanwhile the tooth thickness of the other sleeve chamfer surface 3a-1' which is in contact with the first synchro ring chamfer surface 6a-1 may be set to the small width.

The synchronizer of the sixth embodiment is structured to set the tooth thickness of at least one of the synchronizer sleeve spline tooth 3a and the synchro ring spline tooth 6a to the value so as to be in contact with the chamfer surface with a large area at downshifting, and in contact with the chamfer surface with a small area at upshifting. As other structure of the synchronizer of this embodiment is the same as that of the second embodiment, the same elements are designated as the same reference numerals. Accordingly, the explanation of those elements will be omitted.

Upon downshifting at which the required friction torque capacity is increased to cope with high transmission torque for synchronous shifting, the synchronizer of this embodiment is structured to make a contact with the chamfer surface with the large area so as to increase the sliding work load. Meanwhile upon upshifting at which the required friction torque capacity is small to cope with low transmission torque for synchronous shifting, the synchronizer is structured to make a contact with the chamfer surface with the small area so as to reduce the sliding work load.

In this embodiment, the operation load at upshifting may be reduced compared with the case, for example, the first embodiment in which the contact is made with the chamfer surface with the large area both at downshifting and upshifting on the basis of high transmission torque at downshifting.

The effect of the synchronizer will be described.

The synchronizer of the sixth embodiment is applicable to the first embodiment or the second embodiment. Accordingly, the following effect may be obtained in addition to the effects (1), (2), (3) derived from the first embodiment and the effects (4) derived from the second embodiment.

(8) The tooth thickness of at least one of the synchronizer sleeve spline tooth 3a and the synchro ring spline tooth 6a is set to the value so as to be in contact with the chamfer surface with the large area at downshifting, and the tooth thickness of the other tooth is set to the value so as to be in contact with the chamfer surface with the small area at upshifting. This makes it realize smooth synchronous rotation by keeping sufficient sliding work load both at upshifting and downshifting while reducing the operation load at upshifting.

[Seventh Embodiment]

In the seventh embodiment, the synchronizer is structured to improve strength and durability of the synchro ring spline tooth.

Figure 17A:
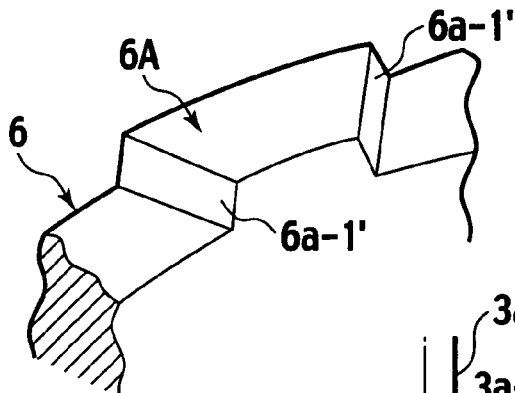
FIG. 17A is a perspective view showing a first synchro ring and a first synchro ring spline tooth in a synchronizer for a transmission according to a seventh embodiment of the invention.
Figure 17B:
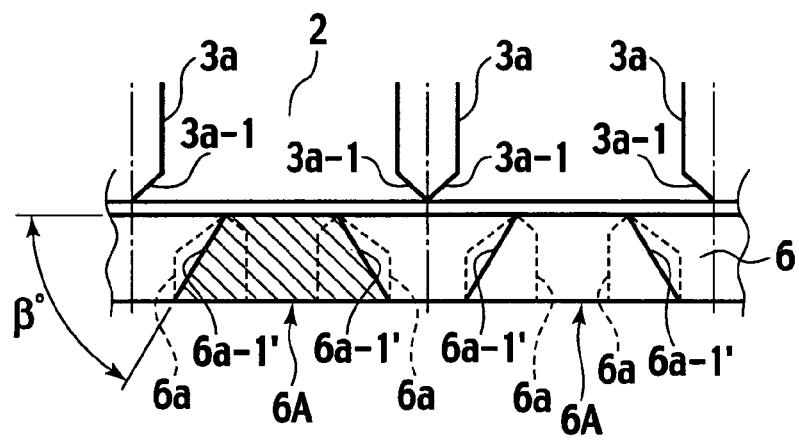
FIG. 17B is a partially development sectional view showing a synchronizer hub, the synchronizer sleeve spline teeth, the first synchro ring and the first synchro ring spline teeth in the synchronizer of the seventh embodiment.

Referring to FIGS. 17A and 17B, a reinforcing member is provided to connect the outer end surfaces of a pair of the adjacent synchro ring spline teeth 6a among those synchro ring spline teeth. The pair of the synchro ring spline teeth 6a represent the teeth that form the edge portion and allow no synchronizer sleeve spline tooth 3a to be placed in the space between the adjacent teeth as shown by a dashed line of FIG. 17B. The reinforcing member represents the member fit with the space between the outer end surfaces of the pair of synchro ring spline teeth 6a so as to be connected together. In the seventh embodiment, a trapezoidal synchro ring spline tooth 6A is formed of the pair of the synchro ring spline teeth 6a and the reinforcing member, having synchro ring chamfer surfaces 6a-1', at both ends as shown by the hatching of FIG. 17B.

The trapezoidal synchro ring spline tooth 6A sets each chamfer cam angle $\alpha°$ of the synchro ring chamfer surface 6a-1' formed at both sides thereof, which is larger than the chamfer cam angle $\alpha°$ of the synchro ring chamfer surface 6a-1 of the single synchro ring spline tooth 6a before it is connected to the adjacent synchro ring spline tooth 6a with the reinforcing member. The chamfer cam angle represents the angle defined by the surface of the first synchro ring 6 that faces the synchronizer hub 2 and the synchro ring chamfer surface 6a-1 or 6a-1'. As other structure of the synchronizer is the same as that of the first embodiment, the same elements are designated as the same reference numerals. The explanation of those elements, thus, will be omitted.

The operation of the synchronizer will be described.

Figure 18A:
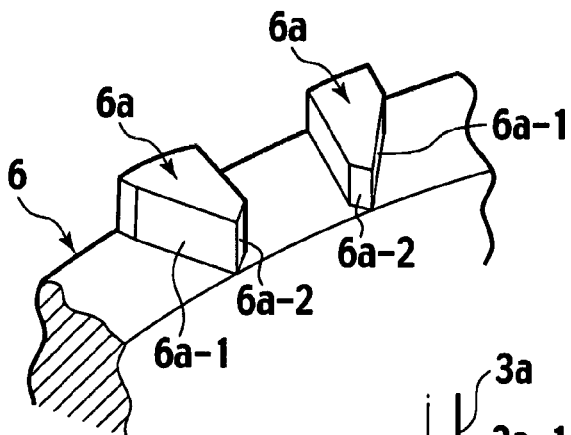
FIG. 18A is a perspective view showing the first synchro ring and the first synchro ring spline teeth in an example corresponding to the first embodiment to be compared with the synchronizer of the seventh embodiment.
Figure 18B:
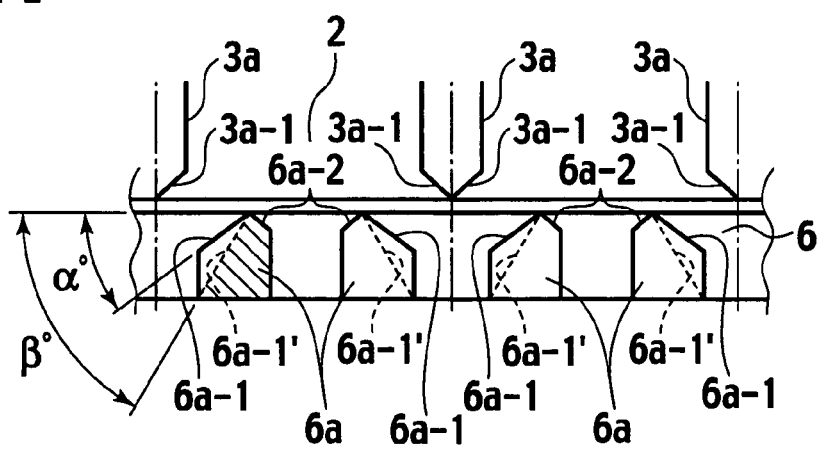
FIG. 18B is a partially development sectional view showing the synchronizer hub, the synchronizer sleeve spline teeth, the first synchro ring and the first synchro ring spline teeth in the example shown in FIG. 18A.

When the chamfer cam angle of the synchro ring chamfer surface 6a-1 of the synchro ring spline tooth 6a is changed from $\alpha°$ to $\beta°$ for the purpose of improving the sliding operation by decreasing the angle of the trough portion T, the cross section area of the dedendum of the synchro ring spline tooth 6a is reduced to two thirds thereof as shown in FIG. 18B. This may deteriorate both strength and durability of the synchro ring spline tooth 6a. As aforementioned, owing to the trade-off relationship between the sliding operation improvement and enhancement of strength and durability of the synchro ring spline tooth 6a, it is difficult to improve the sliding operation while securing strength and durability of the synchro ring spline tooth 6a.

The synchronizer of the seventh embodiment is provided with the trapezoidal synchro ring spline tooth 6A formed by combining a pair of synchro ring spline teeth 6a having no synchronizer sleeve spline tooth 3a in the edge portion therebetween in place of the synchro ring spline teeth 6a. This makes it possible to increase the cross section area of the dedendum of the synchro ring spline tooth twice or larger compared with the synchronizer of the first embodiment without giving the adverse influence on the sliding operation of the synchronizer sleeve spline tooth 3a. The resultant strength and durability of the synchro ring spline tooth, thus, may be considerably enhanced compared with the synchronizer of the first embodiment.

The freedom degree in the design of the chamfer cam angle of the synchro ring chamfer surface 6a-1' may be improved by enhanced strength and durability of the synchro ring spline tooth. Even if each chamfer cam angle of the synchro ring chamfer surfaces 6a-1', of the trapezoidal synchro ring spline tooth 6A is changed to $\beta°$ for the purpose of improving the sliding operation of the synchronizer sleeve spline tooth 3a, the strength and durability of the trapezoidal synchro ring spline tooth 6A may be enhanced.

The effect of the synchronizer will be described.

The synchronizer of the seventh embodiment is applicable to any one of the first to the sixth embodiments. The following effect may be obtained in addition to the effects derived from the first to the sixth embodiments.

(9) In the synchronizer, there is the reinforcing member that combines a pair of the plurality of the synchro ring spline teeth, 6a at the respective outer end surfaces thereof. The strength and durability of the respective synchro ring spline teeth 6a may be enhanced.

(10) The reinforcing member is integrally assembled with the pair of the synchro ring spline teeth 6a, which forms the trapezoidal synchro ring spline tooth 6A having the synchro ring chamfer surfaces 6a-1', formed at both sides. This makes it possible to considerably enhance the strength and durability of the synchro ring spline tooth while simplifying the manufacturing process without increasing the number of parts.

(11) The trapezoidal synchro ring spline tooth 6A is structured such that each chamfer cam angle $\beta°$ of the synchro ring chamfer surfaces 6a-1', formed at both sides is larger than the chamfer cam angle $\alpha°$ of the synchro ring chamfer surface 6a-1 of the synchro ring splint teeth 6a. This makes it possible to enhance the strength and durability of the synchro ring spline tooth and to improve the sliding operation of the synchronizer sleeve spline tooth 3a both at high levels.

While the first to the seventh embodiments of the invention have been described, it is to be understood that changes in or addition to the design may be made without departing from the spirit or scope of the following claims.

In the first embodiment, the synchronizer sleeve spline teeth 3a are arranged at a uniform interval of two pitches 2P, defining the distance between the centers of the first synchro ring spline teeth 6a adjacent to each other as one pitch 1P. However, the synchronizer sleeve spline teeth 3a may be arranged at a uniform interval of four pitches 4P.

As long as the synchro ring spline teeth and the synchronizer sleeve spline teeth are structured such that a pair of synchro ring chamfer surfaces each having the edge portion on the outer side of the center axis of the spline tooth form the trough portion T, and each of the synchronizer sleeve spline teeth is placed in a neutral state only at a position between the pair of the synchro ring chamfer surfaces forming the trough portion T, the specific structure is not limited to those described in the first to the seventh embodiment but the change in or addition to the design may be made.

In the synchronizer of the seventh embodiment, a single reinforcing member is employed to combine a pair of the synchro ring spline teeth together at the respective outer end surfaces. The aforementioned structure may include the combination of the pair of the synchro ring spline teeth together at the outer end surfaces thereof by utilizing one or more reinforcing members.

The synchronizer for the transmission according to the invention is applicable to the synchronizer for a manual transmission that performs shifting by a driver who manually operates a shift lever. It is also applicable to the synchronizer for a transmission including a control type clutch, which performs the shifting by the actuator while disengaging the control type clutch upon shifting, that is, so called automatic MT.

The scope of the invention being indicated by the claims, and all variations which come within the meaning of claims are intended to be embraced herein.

The present disclosure relates to subject matters contained in Japanese Patent Application No. 2004-278221, filed on Sep. 24, 2004, the disclosure of which is expressly incorporated herein by reference in its entirety.

What is claimed is:

1. A synchronizer for a transmission comprising:
   a synchronizer hub connected to a main shaft of the transmission;
   a clutch gear connected to an idle gear of the transmission;
   a synchronizer sleeve connected to the synchronizer hub and slidable thereon to engage with the clutch gear, the synchronizer sleeve provided with sleeve spline teeth each having a sleeve chamfer; and
   a synchro ring having a plurality of pairs of synchro ring spline teeth, each of the synchro ring spline teeth having a synchro ring chamfer configured for receiving one of the sleeve chamfers,
   wherein each of the synchro ring chamfers is formed to have a leading edge offset from the center of each of the synchro ring spline teeth, so that a distance between the leading edges becomes greater than a distance between the centers of the synchro ring spline teeth in each of the pairs of the synchro ring spline teeth, and
   wherein each of the sleeve spline teeth is provided only in an angular position between the synchro ring spline teeth of each of the pairs on the synchronizer sleeve.

2. The synchronizer according to claim 1, wherein the synchro ring spline teeth are arranged at a uniform interval of a predetermined pitch, and the sleeve spline teeth are arranged at a uniform interval of a pitch that is twice the predetermined pitch.

3. The synchronizer according to claim 1, wherein, in each of the pairs of the synchro ring spline teeth, the leading edges of the synchro ring chamfers are formed at positions offset in opposite directions from the center of the respective synchro ring spline teeth.

4. The synchronizer according to claim 1, wherein each of the leading edges of the synchro ring chamfers is formed at a position within a width of the respective synchro ring spline teeth.

5. The synchronizer according to claim 1, wherein each of the leading edges of the synchro ring chamfers is formed at an end portion in a width direction of each of the synchro ring spline teeth.

6. The synchronizer according to claim 1, wherein a tooth thickness of at least one of the sleeve spline teeth and the synchro ring spline teeth is determined based on work load corresponding to a sliding contact between the sleeve chamfer and the synchro ring chamfer.

7. The synchronizer according to claim 1, wherein the synchro ring spline teeth are arranged at a uniform interval of a predetermined pitch, and the sleeve spline teeth are arranged at a uniform interval of a pitch that is four times the predetermined pitch.

8. The synchronizer according to claim 1, wherein the synchronizer hub has a concave portion and the synchro ring has a convex portion engaged in the concave portion, the concave portion and the convex portion are formed into trapezoidal shapes having inclined contact surfaces which cooperate to provide a thrust to the synchro ring by an angular displacement of the synchro ring relative to the synchronizer hub.

9. The synchronizer according to claim 1, wherein a tooth thickness of at least one of the sleeve spline teeth and the synchro ring spline teeth is set such that an area of a sliding contact between the sleeve chamfer and the synchro ring chamfer at downshifting becomes greater than an area of the sliding contact at upshifting.

10. The synchronizer according to claim 1, wherein a reinforcing member is provided between the respective pairs of the synchro ring spline teeth, which connects outermost parts of the synchro ring spline teeth of the respective pairs.

11. The synchronizer according to claim 10, wherein the reinforcing member and the connected synchro ring spline teeth collectively forms a trapezoidal tooth having synchro ring chamfer surfaces at both sides thereof.

12. The synchronizer according to claim 11, wherein the trapezoidal tooth is formed such that a chamfer cam angle of the synchro ring chamfer surface becomes larger than a chamfer cam angle of the synchro ring chamfer surface of one of the synchro ring spline teeth without the reinforcing member.

* * * * *